United States Patent
Kosovan (10) Patent No.: US 9,659,155 B2
(45) Date of Patent: May 23, 2017

(54) SYSTEM AND METHOD FOR SOFTWARE ACTIVATION AND LICENSE TRACKING

(71) Applicant: MacPaw Inc., Santa Clara, CA (US)

(72) Inventor: Oleksandr Kosovan, Kiev (UA)

(73) Assignee: MACPAW INC, Santa Clara, CA (US)

( * ) Notice: Subject to any disclaimer, the term of this patent is extended or adjusted under 35 U.S.C. 154(b) by 0 days.

(21) Appl. No.: 15/017,311

(22) Filed: Feb. 5, 2016

(65) Prior Publication Data

US 2016/0232334 A1    Aug. 11, 2016

Related U.S. Application Data

(60) Provisional application No. 62/113,124, filed on Feb. 6, 2015.

(51) Int. Cl.
| | | |
|---|---|---|
| *G06F 21/00* | (2013.01) | |
| *G06F 21/12* | (2013.01) | |
| *G06F 21/10* | (2013.01) | |
| *H04L 9/32* | (2006.01) | |

(52) U.S. Cl.
CPC .......... *G06F 21/121* (2013.01); *G06F 21/105* (2013.01); *H04L 9/3247* (2013.01); *G06F 2221/0773* (2013.01)

(58) Field of Classification Search
None
See application file for complete search history.

(56) References Cited

U.S. PATENT DOCUMENTS

| | | | | |
|---|---|---|---|---|
| 2006/0107335 A1* | 5/2006 | Frank | ...................... | G06F 21/10 726/27 |
| 2009/0092253 A1* | 4/2009 | Asipov | ................... | H04L 9/083 380/278 |
| 2009/0326964 A1* | 12/2009 | Garg | ...................... | G06F 21/10 705/1.1 |
| 2010/0293622 A1* | 11/2010 | Nikitin | .................... | G06F 21/10 726/31 |
| 2012/0131349 A1* | 5/2012 | Layson | ................. | G06F 21/121 713/182 |
| 2012/0131681 A1* | 5/2012 | Layson | ................. | G06F 21/125 726/28 |
| 2012/0151574 A1* | 6/2012 | Zhang | ................... | G06F 21/121 726/19 |

* cited by examiner

*Primary Examiner* — Jeffery Williams
(74) *Attorney, Agent, or Firm* — Procopio, Cory, Hargreaves & Savitch LLP (57) ABSTRACT

System and method for software activation and further tracking of its states on an end-user computing device (computer) was developed to provide software developers a flexible and secure tool for software distribution and gathering statistics of usage of software activation. The method consists of the following logical steps: (a) obtaining an acquisition confirmation; (b) requesting for a license; (c) issuing and delivering the license to End User; (d) verification of license on the User's computer; (e) storing the license on the User's computer; (f) periodic tracking of activation state, (g) another action with the User's license.

19 Claims, 7 Drawing Sheets

SYSTEM AND METHOD FOR SOFTWARE ACTIVATION AND LICENSE TRACKING

This application claims the benefit of priority under 35 USC 119(e) based on U.S. Provisional Application No. 62/113,124, filed on Feb. 6, 2015, the contents of which is incorporated herein by reference in its entirety.

BACKGROUND

Technical Field

The field of the present invention relates to systems and methods for software activation.

Related Art

Currently there are various related art methods of software activation. Most of the related art methods of software activation require an Internet connection. However, the use of an Internet connection in software activation can cause various problems and disadvantages. For example, but not by way of limitation, there is a problem of unauthorized (e.g., illegal) software usage. Unless the methods of software activation become more sophisticated than those of the related art, the related art problem of security and prevention of illegal software usage will remain in the field of software activation.

SUMMARY

The present invention is directed toward the following aspects: simplifying the activation process for the end user; securing the methods of activation at each step of the activation process to prevent unauthorized (e.g., illegal) software usage; and tracking the activation state in the future to decrease the number of customer support inquiries related to some unexpected issues such as re-activation of software at a new computer, accidently lost activation number, etc.

The first step in the activation process is acquiring an application. The acquiring of the application can occur through purchase, giveaway or any other method defined by the Vendor. A User must receive a confirmation of the acquisition of the application. This confirmation of the acquisition of the application can exist in a form of (but not limited to): (a) an activation key—e.g., a unique combination of symbols, that was provided by software Developer; or (b) a record in a database of the activation system, which is connected to the specific user.

This acquiring of the application can be done in various ways. For example, but not by way of limitation, software may be purchased software at online store, delivery may occur on physical media including, but not limited to, CD, DVD or USB-drive, including software associated with an OEM supply set. Each of these modes of acquisition of the application has a distinct mechanism associated with setting a conformity of acquisition confirmation and also has a set of rules by which the license should be issued.

The acquisition confirmation may include an activation number. From one side, the acquisition confirmation may be human-readable, which may decrease the number of possible errata. From the other side, the acquisition confirmation is long enough to prevent brute-force search. In addition, an activation-by-URL scheme has been developed that allows the Developer to provide users with an option to activate the software with a user action, including (but not limited to) a selection or click action on a button on a web page or in an email.

A record in the database of the activation system, which is associated with a specific user, can be initiated in one or more manners. For example, but not by way of limitation, the record in the database of the activation system may be initiated (a) after the purchase of software in an online or offline store; or (b) manually, by the administrator of the activation system. The user must provide identification information to obtain a software license. The identification information may include, but is not limited to: (a) a unique pair of a login identifier and a password; (b) establishing a secure connection to an activation server, which is protected with a security key provided by the activation server; or (c) a method defined by the administrator of the activation system, which allows for definite identification of the User.

After initiation of the record in the database of the activation system, the next step is to generate a request for a license. This step requires an Internet connection. According to the present example implementation, a protocol is provided. Further, mechanics of how data is processed on the activation server is also provided. The request from the User's Computer may contain the following data, including, but not limited to, one or more of: (a) application bundle ID (e.g., product name in a specific format); (b) bundle version (e.g., product version); (c) additional set of data maintained for the current activation; (d) user's account identifier (e.g., email address); (e) two values for a unique computer identifier; (f) the acquisition confirmation; (g) User's first and last name; (h) a block of random data to increase security; (i) a password to open data on the Server side; and (j) language for an error message.

Once the request for license has been generated, the third step is issuing and delivering the license to the User. After the license request is received, the Server issues a license if the activation request is correct, or else sends an error message. The server response includes the following information: (a) an error code (e.g., 0 in case of success); (b) an error message or an encrypted license; (c) a signature of license file or an error message, which is generated using the private key of the software.

After the software license is delivered to the End User's computer, the software license should pass validation. The license file is written to a specific place on the User's computer file system. As the application runs, the license validity is checked. Only after verification of the license origin (e.g., the license is issued by the valid activation server) and confirmation of completeness, the software installation will be complete, and the software is ready to use.

The state of activation is periodically sent to the activation server. The rules of reporting may be defined by the developer. The activation state can be triggered depending on various conditions defined by developer, for example, re-activating the software if reactivations are allowed.

The example implementation is also directed to the possibility of disabling a license, both remotely (e.g., from the activation server side) and directly (e.g., initiated by the User).

DETAILED DESCRIPTION

The subject matter described herein is taught by way of example implementations. Various details have been omitted for the sake of clarity and to avoid obscuring the subject matter. The examples shown below are directed to structures and functions for software activation and license tracking.

The terms used herein and understood to have their plain and ordinary meaning to those skilled in the art. Terms may be defined by way of example, but are not limited to the definition as provided. For example, but not by way of limitation, a "User" or "End User" may include an entity, such as a person, who has acquired a copy of a software in an authorized manner (e.g., legally), and has configured the software to properly operate on a computing device. Further, a "Developer" or a "Vendor" may be an entity, such a person or legal entity that distributes one or more copies of software, such as a logically completed computer program. Additionally, a "software installation" is a copy of a computer program that has been placed on a User computing device associated with a user, in the way that makes the computer program operate in a manner that was intended by the Developer.

Additionally, "Activation" may include a procedure or set of procedures that confirms the legality of software installation (e.g., whether the software installation was authorized), and removes any functional limitations designed by Developer (if they were present). "Trial" may include a type of software installation usage with the limited functionality made for User to become acquainted with the software. Also, "Acquisition Confirmation" is the digital entity which confirms a right of the User to use software legally (e.g., an authorization), and must be provided to the User after the acquisition process (e.g., a purchase, giveaway, or the like) has been completed.

In addition, "Activation number", or "activation key" may be a human-readable combination (e.g., alphanumeric symbols) which is used as a type of Acquisition confirmation. Further, a "License" may include a computer file that contains data used to identify whether the software installation can be used on a specific computer device. A "License Type" may include a set of rules for license generation, which are set up by the Developer to create different conditions of software usage. Those rules may include, but are not limited to, the period of software usage (e.g., 1-year, 6 month, lifetime), a number of possible re-activations, certain functionality to be provided, etc.

Further, "Activation Server" or "Server" is a remote computing device with respect to the computing device of the User, and which performs necessary operations for software installation activation. According to the example implementations, the server may include hardware that is known to those skilled in the art. Also, "Bundle ID" is an application identifier in a special format that is readable by the operating system of End User's computer.

Aspects of the example implementations are directed to simplifying the activation process for an end user; securing the methods of activation at each step of the activation process to prevent unauthorized (e.g., illegal) software usage; tracking the activation state in the future to decrease the number of customer support inquiries related to some unexpected issues such as re-activation of software at a new computer, accidently lost activation number, etc.

Figure 1:
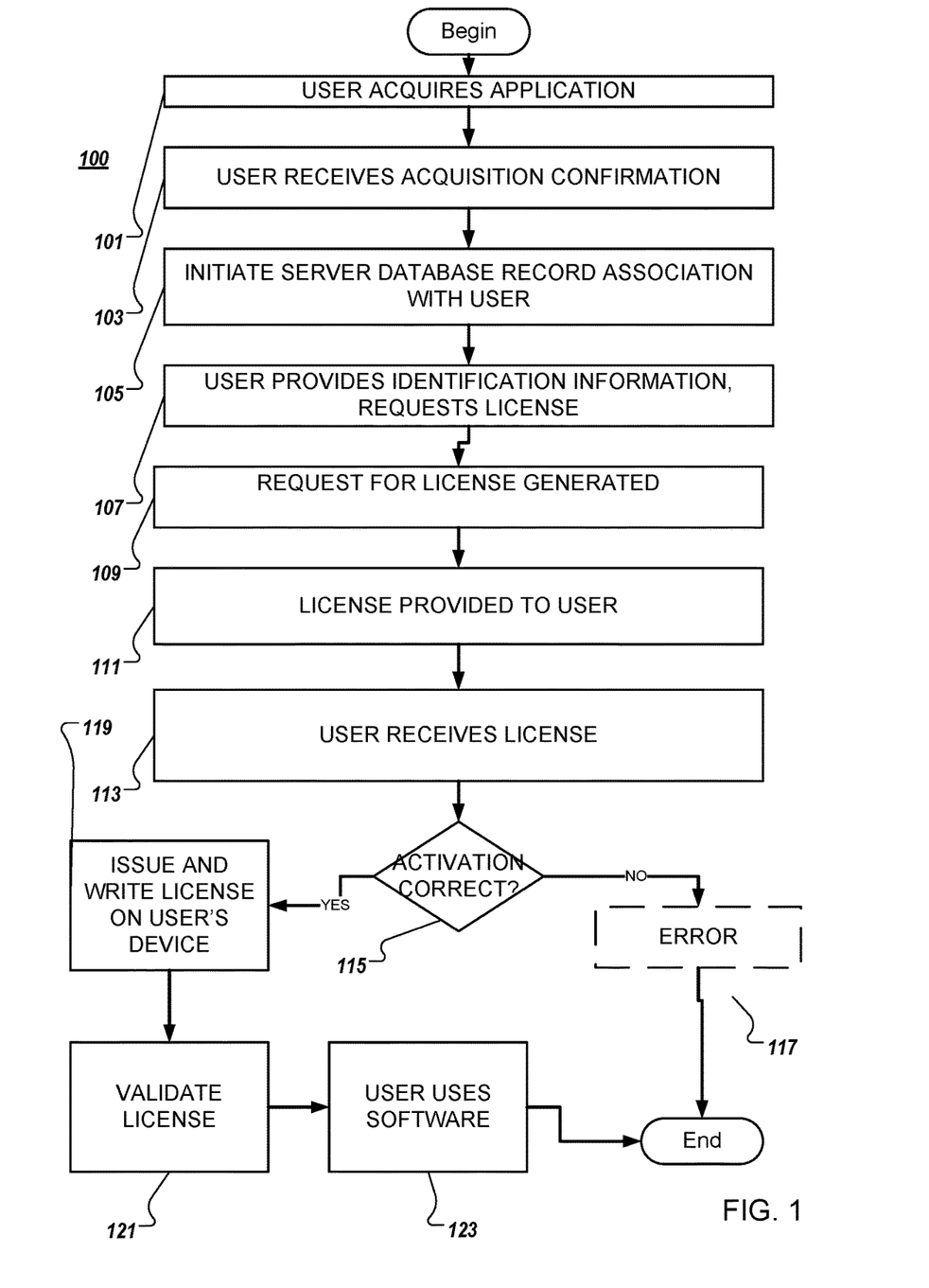
FIG. 1 shows an example process of the protocol including the client and the server according to an example implementation.

To accomplish these and other aspects, various steps may be performed in a process 100, including, but not limited to, the activation process, as shown in FIG. 1. At 101, a user acquires an application. Further, at 103, a User receives a confirmation of the acquisition of the application by one of various modes. Each of the modes of acquisition of the application has a distinct mechanism associated with setting a conformity of acquisition confirmation and a set of rules by which the license should be issued. The acquisition confirmation may include an activation number and may be human-readable, but is long enough to prevent brute-force search by an unauthorized party to determine the activation confirmation. Further, an activation-by-URL scheme according to the example implementation may permit the Developer to provide users with an option to activate the software with a user action.

A record in the database of the activation system associated with a specific user can be initiated at 105. The user must provide identification information to obtain a software license at 107. After initiation of the record in the database of the activation system, a request for a license is generated by a protocol at 109. Once the request for license has been generated at 109, the license is provided to the User at 111, and the user receives the license at 113.

After the license request is received as noted above, the Server determines whether the activation is correct at 115, and issues a license at 119 if the activation request is correct, or else sends an error message at 117. At 119, after the software license is delivered to the End User's computer, it should pass validation. The license file is written to a specific place on the User's computer file system. As the application runs, the license validity is checked at 121. After verification of the license origin and confirming completeness, the software installation is complete, and the software is ready to use at 123. The state of activation is periodically sent to the activation server. Further, a license may be disabled remotely or directly.

Further details of the various operations are explained below in greater detail.

Obtaining an Acquisition Confirmation

To use software in an authorized manner (e.g., legally), a User must receive an acquisition confirmation. Such an acquisition confirmation may exist in various forms, including, but not limited to: (a) an activation key (e.g., a unique combination of symbols, that was provided by software Developer, for example); or (b) a record in the database of the activation system, which is connected with the specific user. After completing the acquisition, the User must be provided with instructions on how to exchange the acquisition confirmation for a software license.

As explained above, the user must obtain an acquisition confirmation (e.g., activation number). A software vendor may have one or more different options of distribution of the activation number:

direct sales (e.g., direct via online sale on vendor website, or through direct vendor retail outlet);

sales via third-party resellers and partners;

distribution either via online or box version on a physical media (e.g., CD, USB-sticks or SD-cards), etc.

The foregoing distribution methods may require different ways and sequences of obtaining an acquisition confirmation. In some cases, the acquisition confirmation can be provided on demand, as soon as the payment received; in other cases, it may be necessary to provide a bulk number of pre-generated activation numbers to be delivered on some physical media. In each case, the Vendor must know more information associated with the conditions (e.g., partner, marketing campaign, data, count and other conditions) under which the activation numbers were generated (e.g., for marketing and analytics purposes).

The example implementation includes at least three basic mechanisms of acquisition confirmation generation:

generation by URL—each request for the acquisition confirmation will be redirected onto specific URL, which is associated with the activation server. In case of a complete and correctly constructed request, the Server will respond with an acquisition confirmation;

'bulk' generation—the Server generates a finite amount of activation numbers, which are provided 'as is' to a software distributor or are spread throughout users;

single generation—this method of generating an acquisition confirmation is mostly used for testing and support purposes, such as when it is necessary to generate one acquisition confirmation.

Acquisition confirmations may be sent by server 'as is', with no encryption.

Generation by URL

Figure 2:
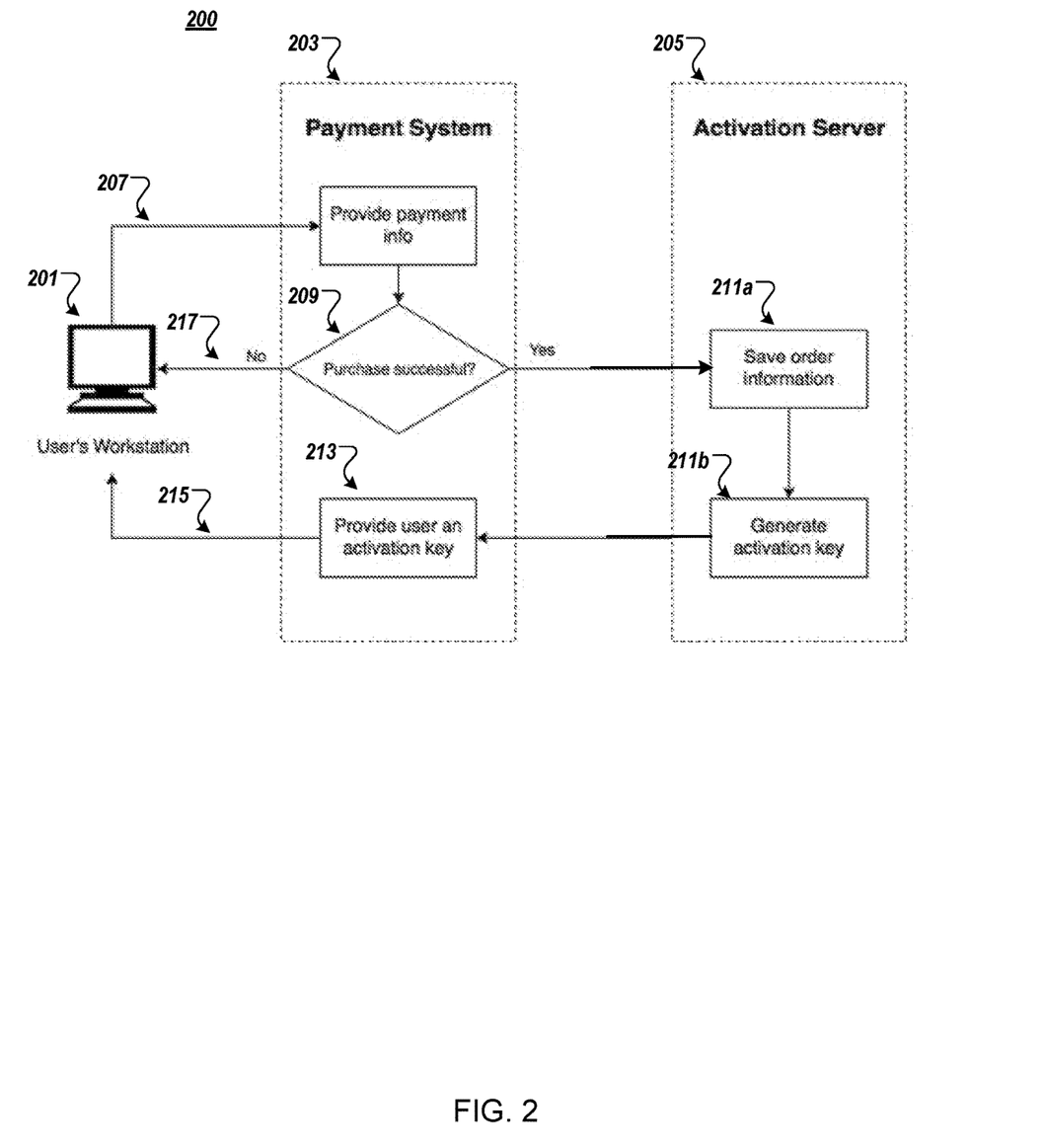
FIG. 2 shows an example for a first protocol according to the example implementation.

This method includes a request for one or more acquisition confirmations. This method is most likely to be used during direct online purchases, but may be used during other modes of obtaining the application. FIG. 2 illustrates an example implementation 200 of the process of requesting an activation code based on generation by URL. In FIG. 2, a user workstation 201, a payment system 203, and an activation server 205 are disclosed. However, other implementations may be substituted therefor with departing from the inventive scope, as would be understood by those skilled in the art.

1. User visits the purchase page (e.g., the developer's website, or at $3^{rd}$-party web-resource, or some either way of purchasing the product). (207)

2. User provides required information, such as his first/last name, e-mail address, phone number, quantity of products, duration of software usage, etc. (207)

3. If the purchase is successful, billing system sends collected information by a specific API to the server of software Vendor; the order information is saved at the activation server and an activation key is generated.(209, 211a, 211b)

4. User obtains an activation key from the activation server, which is sent to the email stated and/or displayed on a purchase page. (213, 215)

5. If payment for some reason cannot be completed, the user is informed about inability to complete the transaction, along with instructions for further actions (re-enter billing information, check bank account, try later, etc.). (217)

Bulk Generation

In another example implementation, 'bulk' activations may be employed, to provide many codes for partners: affiliates, resellers or producers of physical media (CDs, USBs).

In this example implementation, a software vendor can generate certain amount of activation numbers (e.g., in advance) with required marketing parameters or the conditions of contract (e.g., 500 licenses are provided to Resell LLC to be used till Dec. 25, 2017).

In this example implementation, a database having a blank record of order is created, and developer can state the specific pattern of the activation number. The application will ask the end user for his/her personal data (name and email address). Thus, the order record will be filled after the software has been activated.

Single Generation

This option may be implemented for customer support, as well as promotional or test purposes.

According to this example implementation, the software vendor generates an activation code via the special administrator's panel on the server, and then sends this code to the customer or required party. The order record is then filled by the administrator.

Creating a Record in Activation System's Database

Operations for creating a record in the activation system's database after software acquisition are described as follows. It is noted that the User should identify himself or herself on the activation system. This can be done by the one or more of the following methods (but not limited to):

by providing a unique pair of login and password information;

by establishing a secure connection with the activation server, protected with a security key (e.g., encrypted) as provided by the activation server;

by establishing a connection with activation server and sending the parameter, which allows for definitive identification of the User (e.g., by providing session identifier from the third-party service, or any other parameter, defined by activation system administrator).

After User identifies himself or herself on the activation system, the information about software acquisition will be stored as a record in the activation system database.

Issuing a License

After the User receives an acquisition confirmation, he or she must request a license to use the software without limitations.

The process of issuing a license is similar for each type of acquisition confirmation. The difference is in the ways the User provides the acquisition confirmation for receiving the license:

by entering the activation number inside the application;

by activating the application by the URL scheme;

by authenticating on the activation system:

by providing a unique pair of login and password;

by establishing a secure connection with activation server, protected with a security key previously provided;

by establishing a connection with activation server and sending the parameter, which allows for the definitive identification of the User (e.g., by providing session identifier from the third-party service, or any other parameter, defined by activation system administrator).

Figure 3:
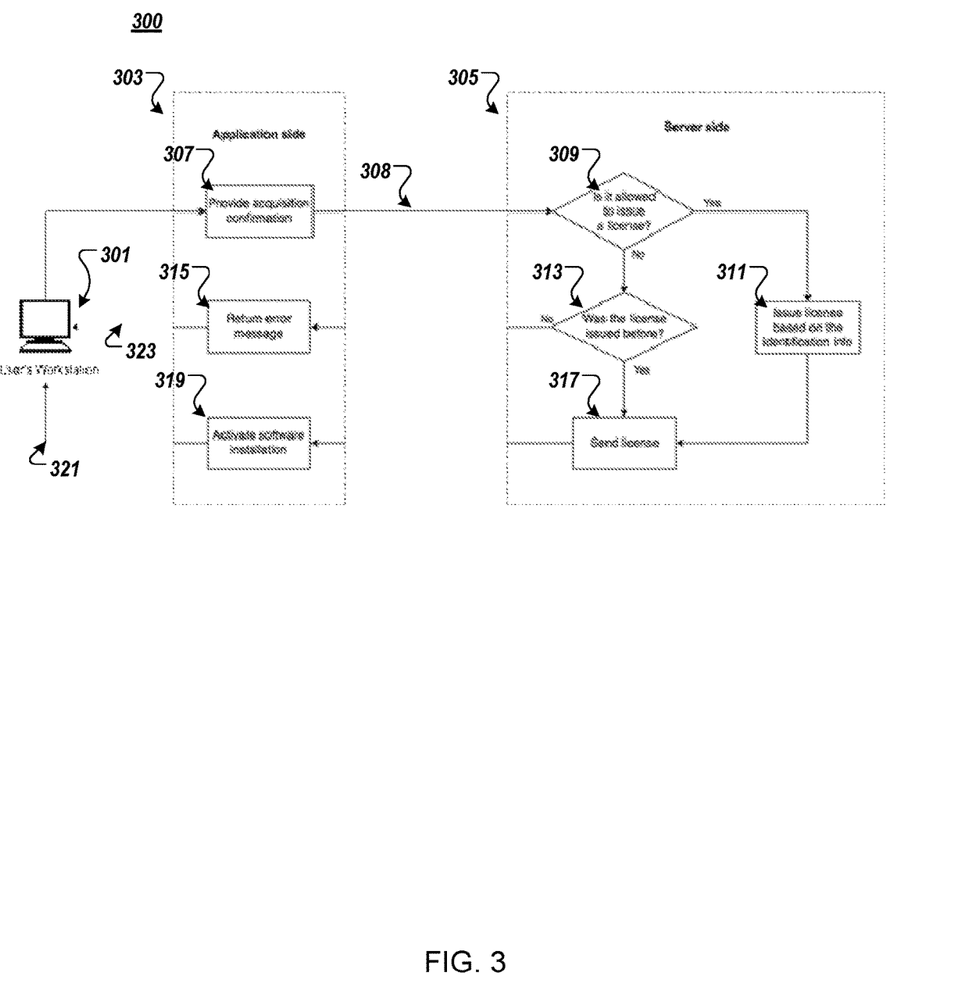
FIG. 3 shows an example for a second protocol according to the example implementation.

The process 300 of the license request is disclosed as follows, and is illustrated in FIG. 3. As shown in FIG. 3, a user computing device (e.g., workstation) 301, application-side operation space 303 (e.g., user-controlled devices) and server-side space (e.g., server having a database) 305 are provided. Operations include, but are not limited to, the following:

1. The User provides an acquisition confirmation by one of the methods described above. (307)

2. Software generates a license request and sends the license request to an activation server. (308)

3. The activation server checks if activation is allowed for this acquisition confirmation (e.g., the activation server may search for an 'active' parameter in activation number record in database). (309)

4. If yes (i.e., activation is allowed), the activation server issues a license based on the identification information (311) and transmits a response to the application containing a License file. (317)

5. The license file passes the validation by an application-side part of activation system.(319)

6. The User is informed that the activation was successful. (321)

7. If activation server determines that an error occurred during activation process (e.g., not allowed to issue a license at 309, and the license was not issued before at 313), the activation server sends back an error code and message to the application, and hence, the user. (315) On the other hand if the activation server determines that it is not allowed to issue a license at 309, but that the license was issued before at 313, then the process continues to send the license as previously issued in 317, as explained above.

8. The software informs the user about the error type with instructions on further actions to address the error (e.g., check the validity of activation code, contact customer support, etc.). (323)

To decrease the number of requests to the server and to simplify the User's input requirements, the pattern recognition system for activation keys was implemented according to the present example implementation. More specifically, that activation keys are generated using a specific pattern, which will be recognized by software installation, and which will trigger the software installation for the specific actions. For example, but not by way of limitation, the activation key with a specific suffix can initiate an appearance of a form for requesting personal data from the user. The vendor can set up the specific patterns and software installation behavior to match their own patterns and behavior.

After the software is registered on Activation server, the activation server issues a pair of private and public keys for the signing of the license. The private key is stored on the server and is used for signing each license before the license is sent to the application. The public key is integrated to the application-side part of the activation system, and is used later for verifying the license signature, as explained further below.

After the successful activation request has occurred, a license is generated on the activation server. As one of its parameters, the license includes hash that is generated based on the following application identifiers:

bundle ID of application;

one or more identifiers of the User's computing device (e.g., hardware), which can be (but is not limited to) a username that is used for authenticating the User on operating system; a MAC-address of network interface card; hard disk drive or solid-state drive; a motherboard identifier, or other identifier as may be known by those skilled in the art;

and the randomly generated string (e.g., 'salt'), which will be included to the license.

Before sending the license file to end user, the license file is encrypted with a symmetric encryption algorithm, and signed with the server signature based on the private key issued during software registration on the Activation server.

Reactivation

To decrease the number of support inquiries caused by the necessity to continue software usage after changing hardware (e.g., changing to a new computer), the re-activation system according to the example implementation has been implemented.

When the activation number is issued, the activation number has the finite number of possible activations. For example, if the user for some reason deactivates the software installation on his/her computer device, and uses the same activation number to activate the software on that same computer device again, the old license will be issued.

On the other hand, if the user changes the computing device, he/she still has a capability to activate software using the same activation number. The information about the number of possible reactivations is stored on the activation server. The activation server automatically adds one additional reactivation once a specified period of time has passed (e.g., six months by default, but not limited thereto). As a result, the user will be able to reactivate the software in case he or she changes the computing device or operating system.

Validation of License

To make the software installation fully functional, it is necessary to check that the license is available on User's computer, and verify its validity. The verification consists of the checks of the following parameters: (a) license origin (e.g., if the license was issued by the correct server); (b) if license was issued to this computer (e.g., if the license was issued to the correct computer); and (c) if license is not expired.

In the related art, the verification process is a period during which a hacker may be able to intrude into the code and receive information necessary to crack an application. To address this risk, the example implementation includes several mechanisms.

At the time points where a license check is necessary (these time points may be defined by the developer, for example, as a launch of application, an upgrade, or for performing some particular action), but the license check has not yet been performed, the application-side of activation system creates a fake license file with intentionally wrong parameters, which are pre-defined by the developer. This is done to prevent the unauthorized party (e.g., hacker) from obtaining data, in the case of an inner intrusion. After the verification process (as described below) has been completed, the intentionally wrong parameters are replaced with the correct ones.

As the license check is required, the application-side part of the activation system is checking the pre-defined storages to determine if the license is available.

At first, the application-side part of the activation systems checks the server signature using the public key that was integrated to the application-side part of application system, as explained above. If the server signature is valid based on the use of the public key, the activation system receives a key for symmetric decryption. The second part of license is then decrypted using this decryption key. As the result of successful decryption, the license information is received.

The next stage is checking the validity of license for the specific computer. In order to perform this check, the application-side of activation system generates a hash string by using the following parameters:

bundle ID of application one or more identifiers of a computing device

'salt' string that is stored in license.

The generated hash string should match the string that is stored in license. If there is not a match, then it is determined that the license is not valid for that particular computer and/or for that particular application.

As a next step, the application-side part of activation system checks to confirm that the license is not expired by comparing the license parameters with the current system and application states. Depending on the license type, the following parameters may be compared:

a) license expiration time with current system time;

b) license subscription end time with current system time;

c) license expiration version with current application version;

d) license beta-only flag with current application version.

Additionally, the application-side part of the activation system may periodically transmit a request to the activation server to validate the license. The request may include an activation identifier and information that is necessary to identify the user's workstation. If the license is still determined to be valid, the server responds with the same license. However, if the license is determined to not still be valid, the server responds with an error message. This method prevents manipulation by using the system time of the user's workstation to extend license duration, as the expiration time is validated by the server system time.

Application-side Part Security

The application-side part of activation system is generated uniquely for each application that is registered at the Activation server. For security purposes, the functions, methods and variables of the programming code of the application-side part of activation system are obfuscated (e.g. are made not-human readable).

The functions to be obfuscated are marked with special markers, and during compilation their names are replaced to random ones from the pre-defined alphabet (usually, it contains alphanumeric symbols: capital and small letters and digits). For each application, the obfuscated names are unique.

Another mechanism for increasing security is by using functions which change the destination address in memory during runtime. More specifically, during the compilation of program code the functions that are used for license verification return intentionally wrong parameters, but during software is in live operation, those functions are redirected to the address in memory, which contains functions that will return the correct parameters. Those functions are named randomly during compilation, so that in case of reverse engineering, software hackers will not be able to determine what those functions actually do. This mechanism may also be implemented at the points when the license check is required as defined by the Developer.

According to the example implementation, the developer is not provided with the name of the function during operation, and need not have this information. For example, but not by way of limitation, the developer may write the software program (e.g., code), and then, when the application is compiled, the functions are named pseudo-randomly (i.e., obfuscated), so that it is not possible to determine the function based on the name of the function, as a security measure.

Remote Disabling of License

If the User requests a refund and the refund request is granted, the user loses the right to use the software. Thus, it is necessary to have a mechanism of remotely revoking the license. This mechanism is also used for handling the subscription tariff plans, when the user needs to pay for the software on a monthly or yearly basis. For example, a user may simply choose to not renew the software without providing an affirmative indication of cancellation.

If the license is marked on the server as not being valid due to the refund or an unpaid subscription (e.g., renewal), the license will be also marked on the application-side part of activation system, and the user will not be able to use the application until the payment has been confirmed.

Disabling License on the Application Side

Additionally, the Developer may be able to add functionality to disable the license inside the application. After the User initiates the disabling of the license, the application-side of activation system sends a request to the server side. Accordingly, the server responds with the license for that particular workstation, which is marked as disabled. This procedure is useful in case the User wants to use the software on another workstation. The user can initiate disabling of the license on the first workstation, and repeat steps necessary to activate the application on the second (e.g., another) workstation.

Using App Store Receipt as License

If the vendor sells application (e.g., both via Apple App Store and via other source), the activation server has the ability to match the App Store Receipt as the license.

For example, but not by way of limitation, it user purchased application via an app store (e.g., Apple App Store), the information about the purchase is sent to the activation server via the public API. If user needs to reactivate the software on his/her computing device, the software installation will be recognized as an activated one, and the license will be issued automatically.

Example Process

Figure 4:
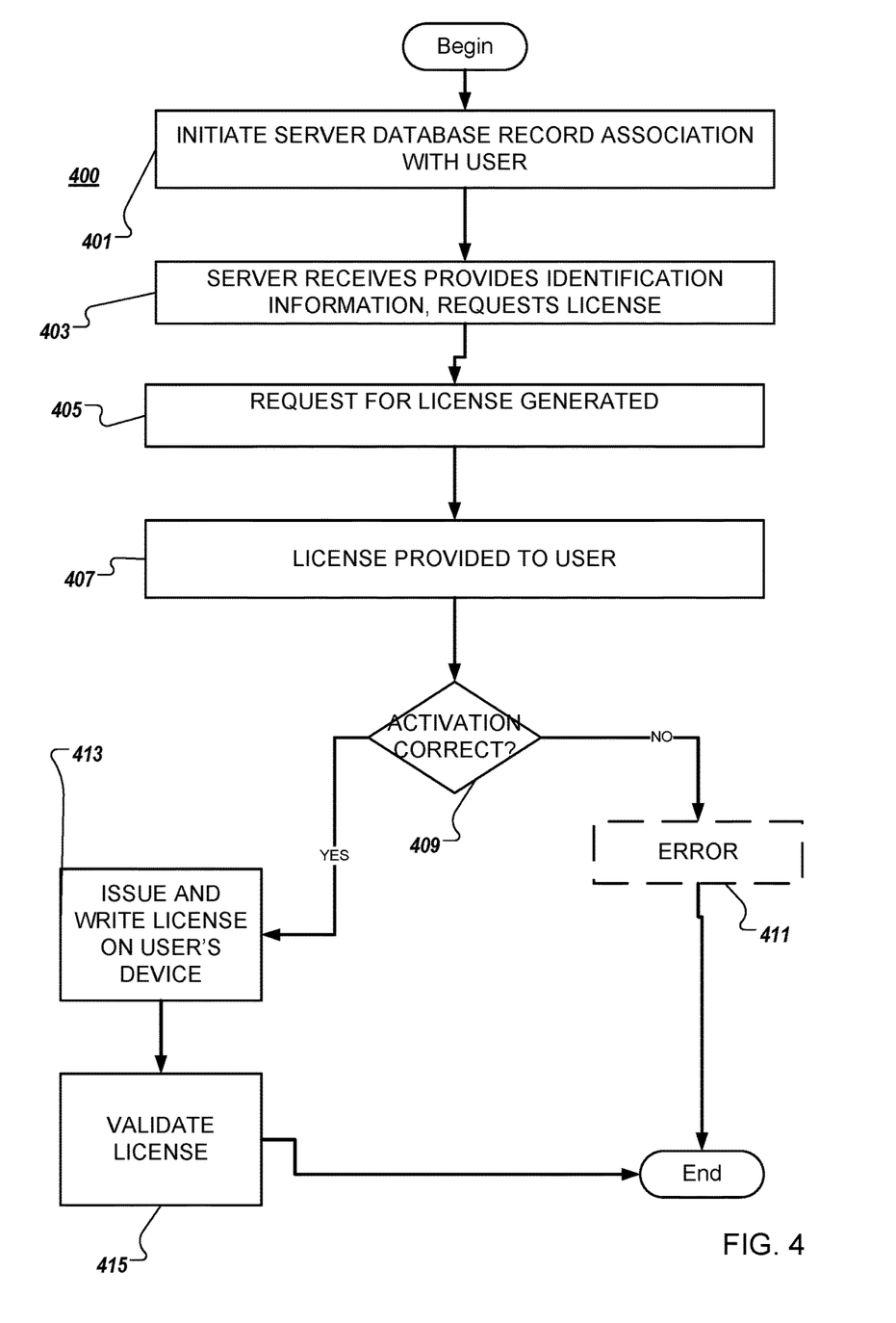
FIG. 4 shows an example process of the protocol including the server according to an example implementation.

FIG. 4 illustrates a process 400 as performed on the server according to the example implementation, and including the foregoing disclosures of FIGS. 1-3. At 401, after a user has acquired an application and received a confirmation of the acquisition of the application by one of various modes, a record in the database of the activation system associated with a specific user is initiated at the server side. Further, the server receives identification information and a license request from the user to obtain a software license at 403. After initiation of the record in the database of the activation system, a request for a license is generated by a protocol at 405. Once the request for license has been generated at 109, the license is provided to the User at 407.

After the license request is received as noted above, the Server determines whether the activation is correct at 409, and issues a license at 413 if the activation request is correct, or else sends an error message at 411. At 413, after the software license is delivered to the End User's computer, it should pass validation at 415. The license file is written to a specific place on the User's computer file system. As the application runs, the license validity is checked at 415. After verification of the license origin and confirming completeness, the software installation is complete, and the software may be used by the user. The state of activation is periodically received by the activation server. Further, a license may be disabled remotely or directly by the activation server.

Figure 5:
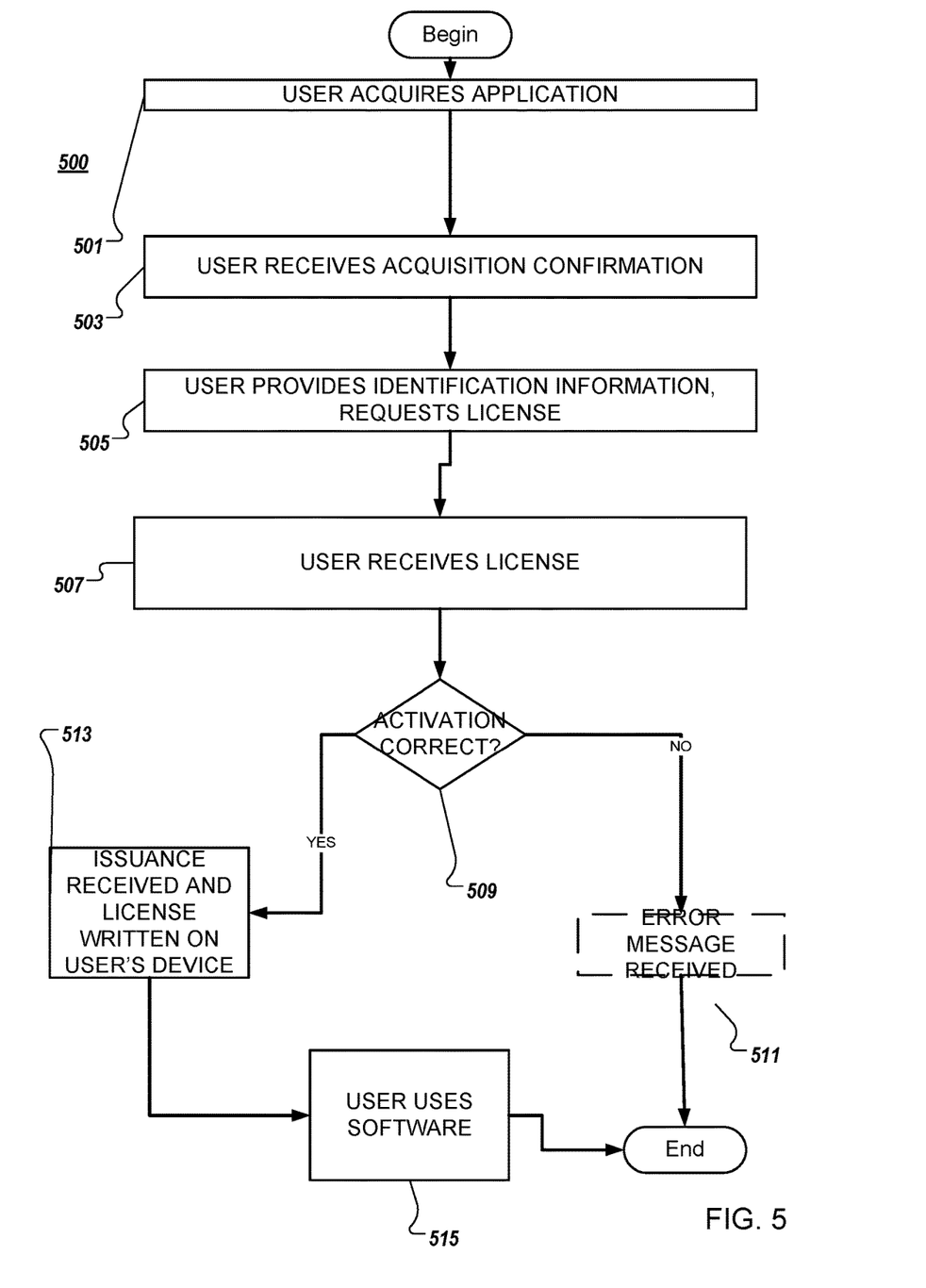
FIG. 5 shows an example process of the protocol including the client according to an example implementation.

FIG. 5 illustrates a process 500 as performed on the server according to the example implementation, and including the foregoing disclosures of FIGS. 1-3. At 501, a user acquires an application. Further, at 503, a User receives a confirmation of the acquisition of the application by one of various modes.

As explained above, each of the modes of acquisition of the application has a distinct mechanism associated with setting a conformity of acquisition confirmation and a set of rules by which the license should be issued. The acquisition confirmation may include an activation number and may be human-readable, but is long enough to prevent brute-force search. Further, an activation-by-URL scheme according to the example implementation may permit the Developer to provide users with an option to activate the software with a user action.

At 505 the user provides identification information and a request to obtain a software license. Once the request for license has been generated by the server, the user receives the license at 507.

After the license request is received at 507, the Server determines whether the activation is correct, and the user receives an issuance of the license at 513 if the activation request is correct, or else receives an error message at 511. At 513, after the software license is received by the End User's computer, it should pass validation. The license file is written to a specific place on the User's computer file system. As the application runs, the license validity is checked. After verification of the license origin and confirming completeness, the software installation is complete, and the software is ready to use at 515. The state of activation is periodically sent to the activation server. Further, a license may be disabled remotely or directly by the server.

In some examples, the foregoing processes illustrated in FIGS. 1-5 may be implemented with different, fewer, or more blocks. The processes may be implemented as computer executable instructions, which can be stored on a medium, loaded onto one or more processors of one or more computing devices, and executed as a computer-implemented method.

Example Environment

Figure 6:
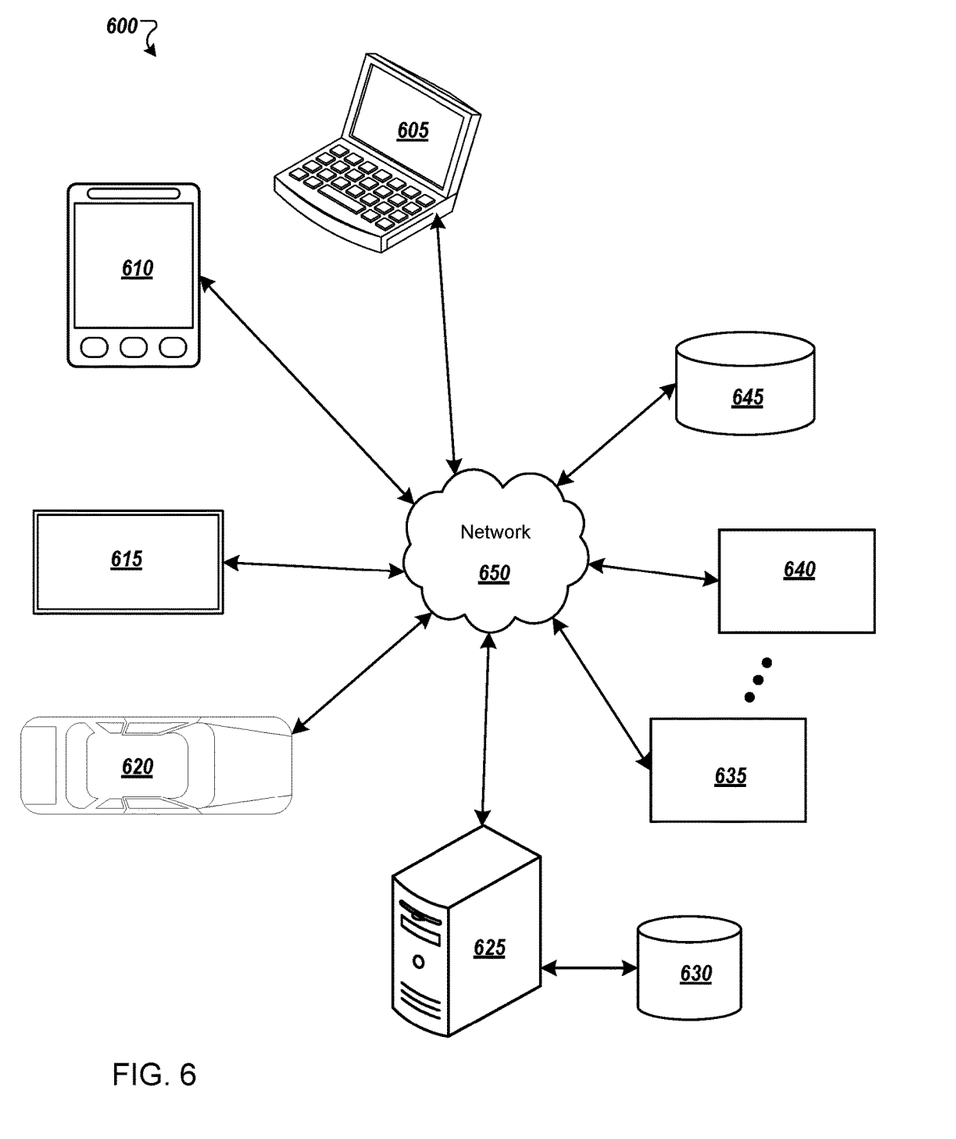
FIG. 6 shows an example environment suitable for some example implementations.

FIG. 6 shows an example environment suitable for some example implementations. Environment 600 includes devices 605-645, and each is communicatively connected to at least one other device via, for example, network 660 (e.g., by wired and/or wireless connections). Some devices may be communicatively connected to one or more storage devices 630 and 645.

An example of one or more devices 605-645 may be computing devices 705 and/or 805 described below in FIGS. 7 and 8, respectively. Devices 605-645 may include, but are not limited to, a computer 605 (e.g., a laptop computing device), a mobile device 610 (e.g., smartphone or tablet), a television 615, a device associated with a vehicle 620, a server computer 625, computing devices 635-640, storage devices 630 and 645.

In some implementations, devices 605-620 may be considered user devices 625-645 may be devices associated with a server as described above and with respect to FIGS. 3-5.

For example, by not by way of limitation, a user having user device 605 or 610 on a network supported by one or more devices 625-645, may have perform the acquire an application, request a license, receive a license, and use the software, using user device 605 or 610. The server may perform the above-described operations using devices 625-645, in accordance with the processes described above with respect to FIGS. 1-5.

Example Computing Environment

Figure 7:
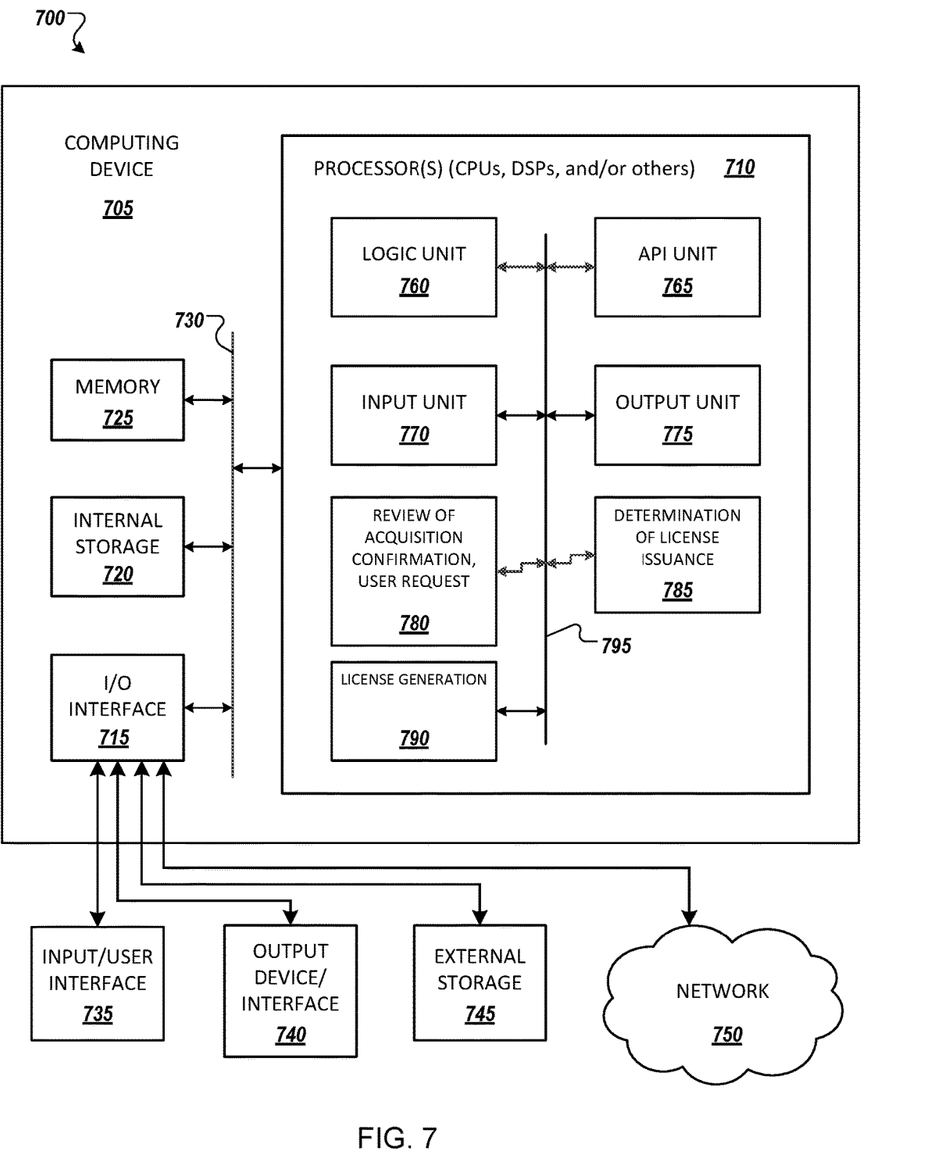
FIG. 7 shows an example computing environment with an example computing device associated with the external host for use in some example implementations.

FIG. 7 shows an example computing environment with an example computing device associated with the external host for use in some example implementations. Computing device 705 in computing environment 700 can include one or more processing units, cores, or processors 710, memory 715 (e.g., RAM, ROM, and/or the like), internal storage 720 (e.g., magnetic, optical, solid state storage, and/or organic), and/or I/O interface 725, any of which can be coupled on a communication mechanism or bus 730 for communicating information or embedded in the computing device 705.

Computing device 705 can be communicatively coupled to input/user interface 735 and output device/interface 740. Either one or both of input/user interface 735 and output device/interface 740 can be a wired or wireless interface and can be detachable. Input/user interface 735 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 740 may include a display, television, monitor, printer, speaker, braille, or the like. In some example implementations, input/user interface 735 and output device/interface 740 can be embedded with or physically coupled to the computing device 705. In other example implementations, other computing devices may function as or provide the functions of input/user interface 735 and output device/interface 740 for a computing device 705.

Examples of computing device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 705 can be communicatively coupled (e.g., via I/O interface 725) to external storage 745 and network 750 for communicating with any number of networked components, devices, and systems, including one or more computing devices of the same or different configuration. Computing device 705 or any connected computing device can be functioning as, providing services of, or referred to as a server, client, thin server, general machine, special-purpose machine, or another label.

The I/O interface 725 may include wireless communication components (not shown) that facilitate wireless communication over a voice and/or over a data network. The wireless communication components may include an antenna system with one or more antennae, a radio system, a baseband system, or any combination thereof. Radio frequency (RF) signals may be transmitted and received over the air by the antenna system under the management of the radio system.

I/O interface 725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computing device 705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 710 can execute under any operating system (OS) (not shown), in a native or virtual environment. One or more applications can be deployed that include logic unit 760, application programming interface (API) unit 765, input unit 770, output unit 775, acquisition confirmation and user request review unit 780, license issuance determination 785, license generation unit 790, and inter-unit communication mechanism 795 for the different units to communicate with each other, with the OS, and with other applications (not shown). For example, acquisition confirmation and user request review unit 780, license issuance determination 785, and license generation unit 790 may implement one or more processes shown in FIGS. 1-5. The described units and elements can be varied in design, function, configuration, or implementation and are not limited to the descriptions provided.

In some example implementations, when information or an execution instruction is received by API unit 765, it may be communicated to one or more other units (e.g., logic unit 760, input unit 770, output unit 775, acquisition confirmation and user request review unit 780, license issuance determination 785, and license generation unit 790).

For example, after input unit 770 has received input from a user, such as an instruction to acquire an application, a license request, or other such user interaction, input unit 770 may use API unit 765 to communicate the data acquisition confirmation and user request review unit 780. For example, acquisition confirmation and user request review unit 780 may make a determination regarding whether a license should be issued, as explained above.

Acquisition confirmation and user request review unit 780 may, via API unit 765, interact with the license issuance determination 785 to provide an output as to whether a license should be issued. Using API unit 765, acquisition confirmation and user request review unit 780 may interact with license generation unit 790 to generate the license and provide the license to the user, as explained above.

In some instances, logic unit 760 may be configured to control the information flow among the units and direct the services provided by API unit 765, input unit 770, output unit 775, acquisition confirmation and user request review unit 780, license issuance determination 785, and license generation unit 790 in some example implementations described above. For example, the flow of one or more processes or implementations may be controlled by logic unit 760 alone or in conjunction with API unit 765.

The example implementations may have various benefits and advantages. For example, but not by way of limitation, increased security is provided during the license activation and verification process, to reduce the risk of a hacker obtaining sensitive information or using the application, as well as the risk of an information leakage to a developer of the software.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

The invention claimed is:

1. A method for software activation and license tracking, comprising:
   (a) obtaining an acquisition confirmation associated with an acquisition of the software, and providing the acquisition confirmation to a server associated with software activation and licensing;
   (b) requesting a license for a client to be authorized to use the software;
   (c) issuing and providing the license to a client;
   (d) verifying the license at the client;
   (e) storing the license at the client;
   (f) on a periodic basis, tracking an activation state of the license; and
   (g) performing an action on the license at the client, based on the activation state of the license;
   wherein the verifying the license comprises the client associated with the application generating a fake license file that includes incorrect parameter information, performing the verification of the license, and once the verification of the license has been completed, replacing the incorrect parameter information with correct parameter information.

2. The method of claim 1, wherein the acquisition confirmation comprises at least one of an activation key and a record in a database associated with the server, and further wherein the server provides the user with an instruction to exchange the acquisition confirmation for the software license.

3. The method of claim 1, wherein the acquisition confirmation is obtained by one of direct sales, sales via a third-party reseller, and distribution via online or box version on a physical media.

4. The method of claim 1, wherein the acquisition confirmation is generated by at least one of (a) a uniform resource locator (URL) associated with the server that generates the acquisition conformation; (b) a bulk generation of a plurality of acquisition confirmations; and (c) a single generation of the acquisition confirmation.

5. The method of claim 4, wherein the acquisition confirmation generated by the URL comprises,
   providing the user with webpage access for obtaining the acquisition confirmation,
   receiving required information associated with the user;
   for a purchase of the application being successful, providing the required information of the user to the server, wherein order information of the application is saved at the server, and the acquisition confirmation is generated by the server, and providing the acquisition information to the user; and
   for a purchase of the application not being successful, providing the user with an indication that the purchase of the application was not successful.

6. The method of claim 1, wherein the acquisition confirmation is provided to the user without encryption.

7. The method of claim 1, further comprising creating a record in the server associated with the generation of the acquisition confirmation by one or more of providing a unique pair of login and password information, establishing a secure connection with the server protected with a security key, and establishing a connection with the server and sending a parameter that identifies the user, wherein after the user provides an identification, storing the information about the acquisition of the application in the server.

8. The method of claim 1, wherein the (c) and the (d) comprise:
- wherein the verifying the license at the client comprises:
- receiving the acquisition confirmation from the user; and
- generating and providing, from the client, the license request to the server;
- wherein the issuing and providing the license to the client comprises:
- determining, by the server, if activation is permitted for the acquisition confirmation; and
- for the activation being permitted, the server issuing a license based on the identification information of the user, and providing a file of the license to the user.

9. The method of claim 1, wherein the acquisition confirmation comprises one or more activation keys generated using a pattern having a specified suffix that is recognized by installation of the application, and will trigger appearance of a form for the user to provide information to the server, wherein a vendor of the application can determine the pattern based on its own pattern.

10. The method of claim 1, wherein the license is generated including parameters associated with at least one of a bundle ID of the application, one or more identifiers of the client, and a randomly generated string.

11. The method of claim 1, wherein the verification comprises:
- the client associated with the application checking a signature of the server using a public key integrated to the client;
- for the signature determined to be valid based on the public key, the client receiving a key for symmetric decryption;
- decrypting a part of the license using the key for symmetric decryption; and
- checking a validity of the license on the client by the client generating a hash string, and for the hash string matching a string stored in the license, the client confirming that the license is not expired by comparing a parameter of the license with one or more current system and application states.

12. The method of claim 1, wherein during compilation of the application, functions used for license verification return intentionally incorrect parameters, and during operation of the application, the functions are redirected to an address in memory that contains correct parameters, so that a developer of the application does not have the correct parameters.

13. A non-transitory computer-readable medium configured to perform operations for software activation and license tracking, the operations comprising:
- (a) obtaining an acquisition confirmation associated with an acquisition of the software, and providing the acquisition confirmation to a server associated with software activation and licensing;
- (b) requesting a license for a client to be authorized to use the software;
- (c) issuing and providing the license to a client;
- (d) verifying the license at the client;
- (e) storing the license at the client;
- (f) on a periodic basis, tracking an activation state of the license; and
- (g) performing an action on the license at the client, based on the activation state of the license;
- wherein the verifying the license comprises the client associated with the application generating a fake license file that includes incorrect parameter information, performing the verification of the license, and once the verification of the license has been completed, replacing the incorrect parameter information with correct parameter information.

14. The method of claim 13, wherein the acquisition confirmation is generated by the URL by,
- providing the user with webpage access for obtaining the acquisition confirmation,
- receiving required information associated with the user;
- for a purchase of the application being successful, providing the required information of the user to the server, wherein order information of the application is saved at the server, and the acquisition confirmation is generated by the server, and providing the acquisition information to the user; and
- for a purchase of the application not being successful, providing the user with an indication that the purchase of the application was not successful.

15. The non-transitory computer readable medium of claim 13, wherein the acquisition confirmation is provided to the user without encryption.

16. The non-transitory computer readable medium of claim 13, further comprising creating a record in the server associated with the generation of the acquisition confirmation by one or more of providing a unique pair of login and password information, establishing a secure connection with the server protected with a security key, and establishing a connection with the server and sending a parameter that identifies the user, wherein after the user provides an identification, storing the information about the acquisition of the application in the server.

17. The non-transitory computer readable medium of claim 13, wherein the verifying the license at the client comprises:
- receiving the acquisition confirmation from the user;
- generating and providing, from the client, the license request to the server;
- wherein the issuing and providing the license to the client comprises:
- determining, by the server, if activation is permitted for the acquisition confirmation; and
- for the activation being permitted, the server issuing a license based on the identification information of the user, and providing a file of the license to the user, and wherein the acquisition confirmation comprises one or more activation keys generated using a pattern having a specified suffix that is recognized by installation of the application, and will trigger appearance of a form for the user to provide information to the server, wherein a vendor of the application can determine the pattern based on its own pattern.

18. The non-transitory computer readable medium of claim 13, further comprising a verification of the license that comprises the client associated with the application generating a fake license file that includes incorrect parameter information, performing the verification of the license, and once the verification of the license has been completed, replacing the incorrect parameter information with correct parameter information, and wherein the verification comprises:
- the client associated with the application checking a signature of the server using a public key integrated to the client;
- for the signature determined to be valid based on the public key, the client receiving a key for symmetric decryption;
- decrypting a part of the license using the key for symmetric decryption;

checking a validity of the license on the client by the client generating a hash string, and for the hash string matching a string stored in the license, the client confirming that the license is not expired by comparing a parameter of the license with one or more current system and application states.

19. The non-transitory computer readable medium of claim 13, wherein during compilation of the application, functions used for license verification return intentionally incorrect parameters, and during operation of the application, the functions are redirected to an address in memory that contains correct parameters, so that a developer of the application does not have the correct parameters.

* * * * *

UNITED STATES PATENT AND TRADEMARK OFFICE
CERTIFICATE OF CORRECTION

PATENT NO. : 9,659,155 B2  
APPLICATION NO. : 15/017311  
DATED : May 23, 2017  
INVENTOR(S) : Oleksandr Kosovan Page 1 of 3

It is certified that error appears in the above-identified patent and that said Letters Patent is hereby corrected as shown below:

In the Drawings

Replace published FIG. 2 with attached supplemental replacement FIG. 2.

Replace published FIG. 3 with attached supplemental replacement FIG. 3.

In the Claims

In Column 14, Line 39, replace "conformation" with "confirmation".

Signed and Sealed this  
Thirty-first Day of October, 2017

Joseph Matal  
*Performing the Functions and Duties of the*  
*Under Secretary of Commerce for Intellectual Property and*  
*Director of the United States Patent and Trademark Office*

FIG. 2

FIG. 3